US008929739B2

(12) United States Patent
Hsieh et al.

(10) Patent No.: US 8,929,739 B2
(45) Date of Patent: Jan. 6, 2015

(54) REMOTE CONTROL APPARATUS

(75) Inventors: Kuan-Hong Hsieh, New Taipei (TW); Han-Che Wang, New Taipei (TW); Hsin-Nan Hu, New Taipei (TW); Hai-Jin Li, Shenzhen (CN)

(73) Assignee: Scien8izIP Consulting (Shenzhen) Co., Ltd., Guangdong (CN)

( * ) Notice: Subject to any disclaimer, the term of this patent is extended or adjusted under 35 U.S.C. 154(b) by 165 days.

(21) Appl. No.: 13/551,626

(22) Filed: Jul. 18, 2012

(65) Prior Publication Data

US 2013/0156435 A1 Jun. 20, 2013

(30) Foreign Application Priority Data

Dec. 15, 2011 (CN) .......................... 2011 1 0420294

(51) Int. Cl.
*H04B 10/00* (2013.01)

(52) U.S. Cl.
USPC ........................................... 398/106; 398/107

(58) Field of Classification Search
CPC ............................ G08C 2201/93; G08C 23/04
USPC .......................................................... 398/106
See application file for complete search history.

(56) References Cited

U.S. PATENT DOCUMENTS 8,587,524 B2 * 11/2013 Hsieh et al. .................... 345/169
8,605,060 B2 * 12/2013 Hsieh et al. .................... 345/175
2006/0263091 A1 * 11/2006 Shimizu ........................ 398/106
2007/0140697 A1 * 6/2007 Miyake et al. ................ 398/106
2007/0201705 A1 * 8/2007 Dorogusker et al. .......... 381/104
2007/0283396 A1 * 12/2007 Kiujlaars ........................ 725/81
2008/0247757 A1 * 10/2008 Um et al. ...................... 398/106
2008/0272930 A1 * 11/2008 Morillas Bueno et al. ........................ 340/825.72
2008/0317471 A1 * 12/2008 Yuan ............................ 398/106
2009/0047022 A1 * 2/2009 Newman et al. .............. 398/106
2009/0052900 A1 * 2/2009 Hong ............................ 398/111
2010/0017736 A1 * 1/2010 Kim .............................. 715/771
2010/0028010 A1 * 2/2010 Zhao et al. .................... 398/106
2011/0158652 A1 * 6/2011 Friedman ...................... 398/116
2012/0089937 A1 * 4/2012 Hsieh et al. .................. 715/773
2012/0327030 A1 * 12/2012 Hsieh et al. .................. 345/175
2013/0005250 A1 * 1/2013 Kim et al. .................... 455/41.1
2013/0136455 A1 * 5/2013 De Buysscher et al. ...... 398/106
2013/0156434 A1 * 6/2013 Hsieh et al. .................. 398/106
2013/0156435 A1 * 6/2013 Hsieh et al. .................. 398/106
2013/0162412 A1 * 6/2013 Yu et al. ........................ 340/12.5
2013/0219324 A1 * 8/2013 Seo et al. ...................... 715/780
2014/0148147 A1 * 5/2014 Tak et al. ...................... 455/420
2014/0167931 A1 * 6/2014 Lee et al. ...................... 340/12.5

FOREIGN PATENT DOCUMENTS

WO 2007143687 A2 12/2007

* cited by examiner

*Primary Examiner* — Daniel Dobson
*Assistant Examiner* — Amritbir Sandhu
(74) *Attorney, Agent, or Firm* — Novak Druce Connolly Bove + Quigg LLP

(57) ABSTRACT

A remote control apparatus for controlling a plurality of remote controllable appliances includes a housing, an infrared signal receiving window and an infrared signal transmitting window defined in the housing. The remote apparatus determines the selected appliance and the selected function based upon a wireless signal carrying an identification transmitted by the mobile terminal, determines an infrared remote control code, and emits an infrared signal carrying the infrared remote control code. A light directing element received in the housing directs the infrared signal emitting by the infrared transmitting unit and the infrared remote control signal from the attached remote control to exit the housing through the infrared signal transmitting window, thereby controlling the selected appliance to execute the selected function.

4 Claims, 7 Drawing Sheets

REMOTE CONTROL APPARATUS

CROSS-REFERENCES TO RELATED APPLICATIONS

This application is related to a co-pending U.S. patent application Ser. No. 13/551,624 and entitled "REMOTE CONTROL SYSTEM AND APPARATUS", which has the same assignees as the current application.

BACKGROUND

1. Technical Field

The present disclosure relates to remote controllers and, particularly, to a remote control system and an apparatus capable of remote control operation via a wireless mobile terminal.

2. Description of Related Art

Remote controls are generally employed to remotely control digital appliances within in a predetermined area. However, the remote controller can only be used to control a pre-designated appliance. Therefore, if user has a number of appliances, a number of remote controls are needed. A number of remote controls are inconvenient for user.

BRIEF DESCRIPTION OF THE DRAWINGS

The components of the drawings are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
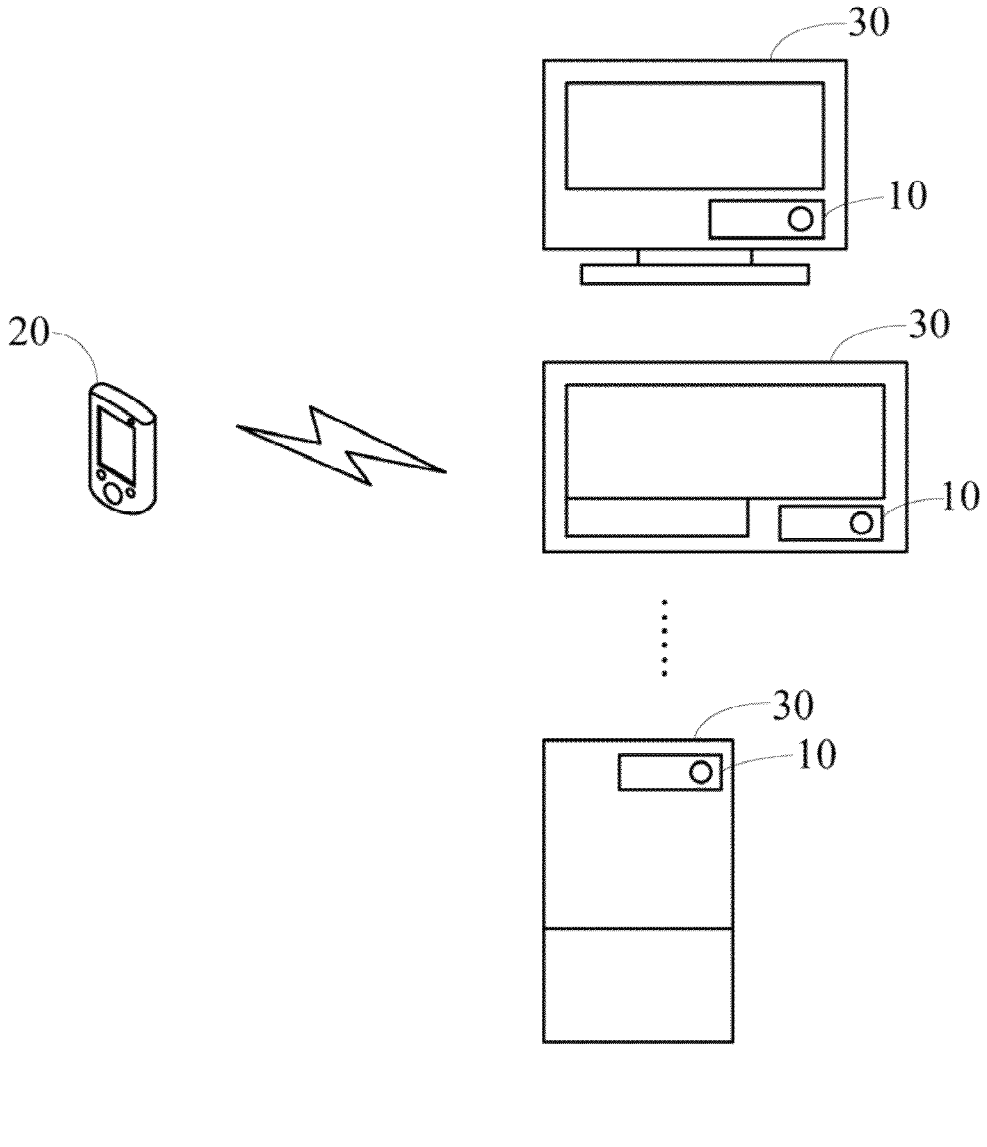
FIG. 1 is a schematic diagram of a mobile terminal controlling a plurality of appliances with remote control apparatus remotely in accordance with an exemplary embodiment.

FIG. 1 is a schematic diagram of a mobile terminal remotely controlling a plurality of appliances by a number of remote control apparatuses. The mobile terminal 20, such as an e-book, a personal digital assistant (PDA), a mobile phone, or a tablet computer, communicates with the remote control apparatus 10 by wireless network, such as WiFi, Bluetooth, or ZigBee, for example. Each remote control apparatus 10 is mounted on the surface of one appliance 30.

The mobile terminal 20 displays information of the appliances 30 and function information of each appliance 30 which is pre-stored in the mobile terminal 20 for a user to select. The mobile The mobile terminal includes an input unit (not shown), configured for allowing a user to select the appliance 30 and select a function to be performed on the selected appliance 30. The mobile terminal 20 generates a wireless signal carrying an identification according to the selected appliance 30 and the selected function and transmits the wireless signal to the remote control apparatus 10. The identification includes information and the selected function of the selected appliance 30.

Figure 2:
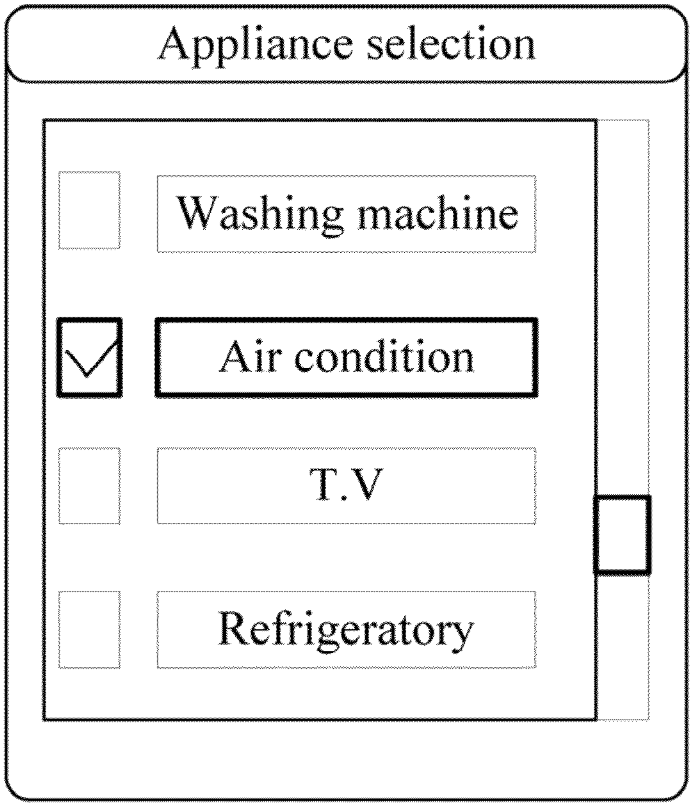
FIG. 2 is a schematic diagram showing a state of use of selecting appliances on the mobile terminal of FIG. 1 in accordance with an exemplary embodiment.
Figure 3:
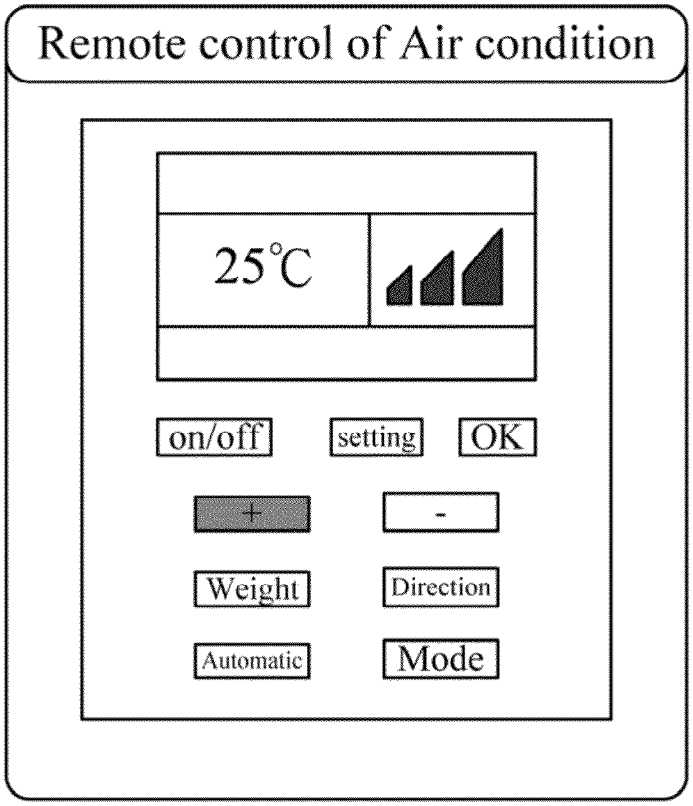
FIG. 3 is a schematic diagram showing a state of use of providing a remote control interface of a selected appliance on the mobile terminal of FIG. 1 in accordance with an exemplary embodiment.

FIGS. 2 and 3, the input unit displays a first user interface displaying the appliance icons representing the respective appliances 30. For example, if the appliance icon "air condition" is selected, the input unit further displays a second user interface displaying function icons representing functions of the selected appliance icon. When one of the function icons is selected, the mobile terminal 20 generates a wireless signal carrying an identification for identifying the selected appliance 30 and the selected function to the remote control apparatus 10. In the embodiment, the mobile terminal 20 is a tablet computer with a touch screen, and produces a trigger signal in response to a user's touch on the icons. The mobile terminal 20 determines the selected appliance icon and function icon in response to the trigger signal.

In the embodiment, the mobile terminal 20 marks the previously selected function icon on the second user interface. For example, when the air condition is working in automatic state, the mobile terminal 20 displays the function icon "Automatic" marked on the second user interface in dark color.

Figure 4:
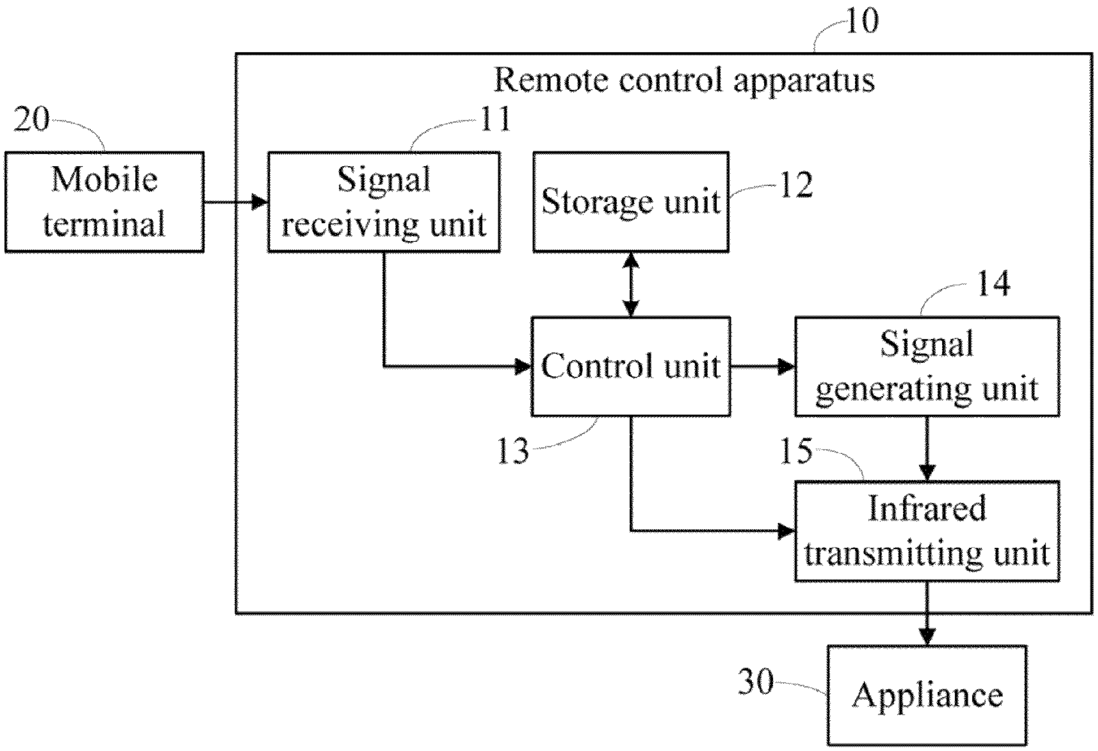
FIG. 4 is a block diagram of the remote control apparatus of FIG. 1 in accordance with an exemplary embodiment.
Figure 5:
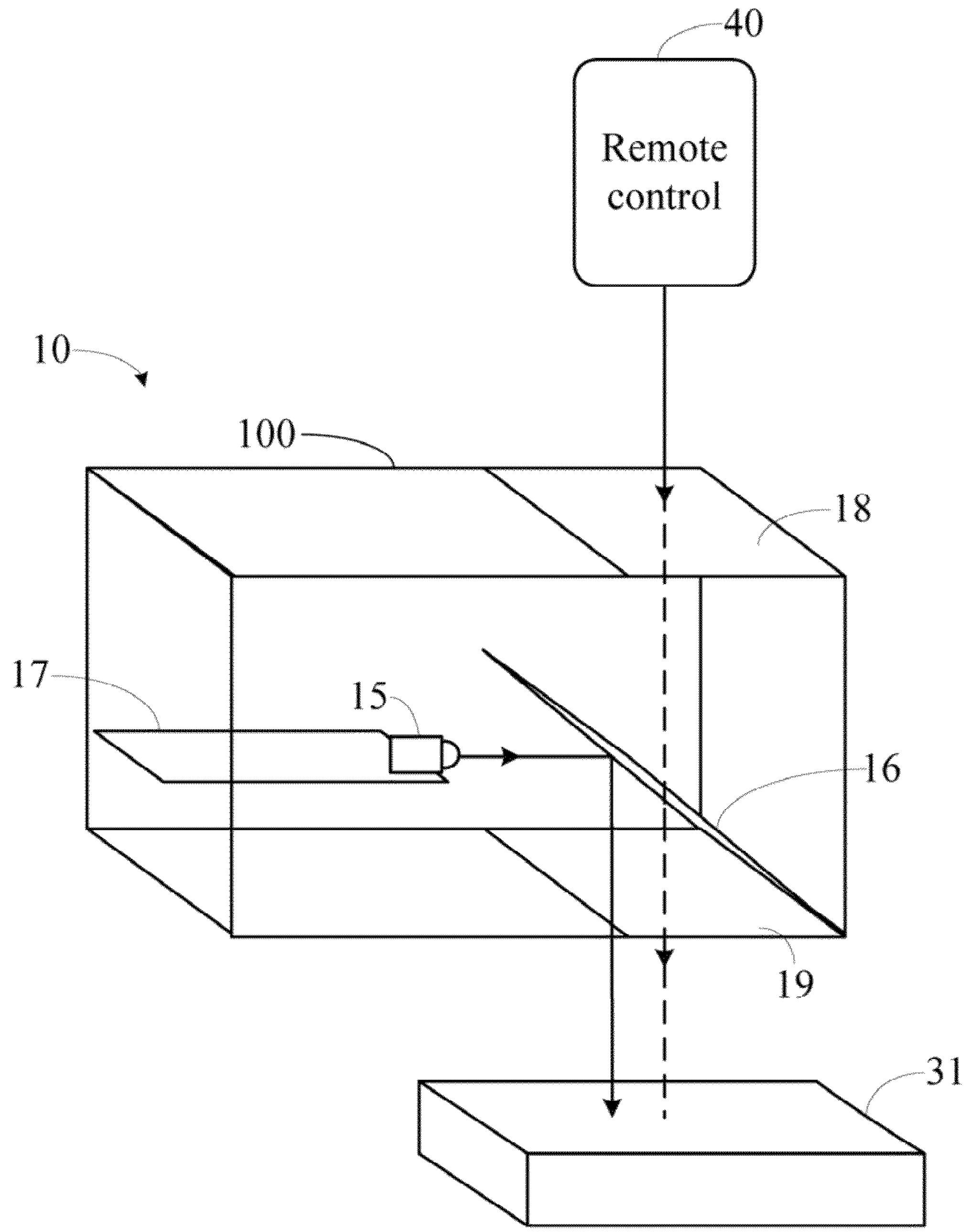
FIG. 5 is a schematic diagram of the remote control apparatus of FIG. 1 in accordance with an exemplary embodiment.

Referring to FIGS. 4 and 5, each remote control apparatus 10 includes a housing 100, a signal receiving unit 11, a storage unit 12, a control unit 13, a signal generating unit 14, and an infrared transmitting unit 15. The storage unit 12 stores a mapping relationship between the identifications of the appliances 30 and infrared remote control codes. The signal receiving unit 11 received in the housing 100, and receives the wireless signal transmitted by the mobile terminal 20. The control unit 13 determines whether the identification carried by the wireless signal matches the identification in the relationship list. If the identification of the wireless signal is determined to match the identification in the relationship list, the control unit 13 and further determines the infrared remote control code according to the mapping relationship. The signal generating unit 14 generates an infrared signal carrying the determined infrared remote control code. The infrared transmitting unit 15 transmits the infrared signal to the selected appliance 30. The selected appliance 30 receives the infrared signal to execute the corresponding function of the infrared signal. Thereby, the mobile terminal 20 remotely controls the appliance 30 via the remote control apparatus 10. If the identification of the wireless signal does not match the identification in the relationship list, the signal receiving unit 11 goes on detecting the wireless signal transmitted by the mobile terminal 20.

Also referring to FIG. 5, a first window 18 and a second window 19 are defined in the housing 100. The second window 19 faces the infrared transmitting unit 15 to pass the infrared signal emitted by the infrared transmitting unit 15 to enter a third window 31 defined on the appliance 30 and received by the appliances 30. A circuit board 17 is received in the housing 100 including a mounted signal receiving unit 11, the storage unit 12, the control unit 13, the signal generating unit 14, and the infrared transmitting unit 15. In the embodiment, the remote control apparatus 10 further includes a light directing element 16 received in the housing 100.

Figure 6:
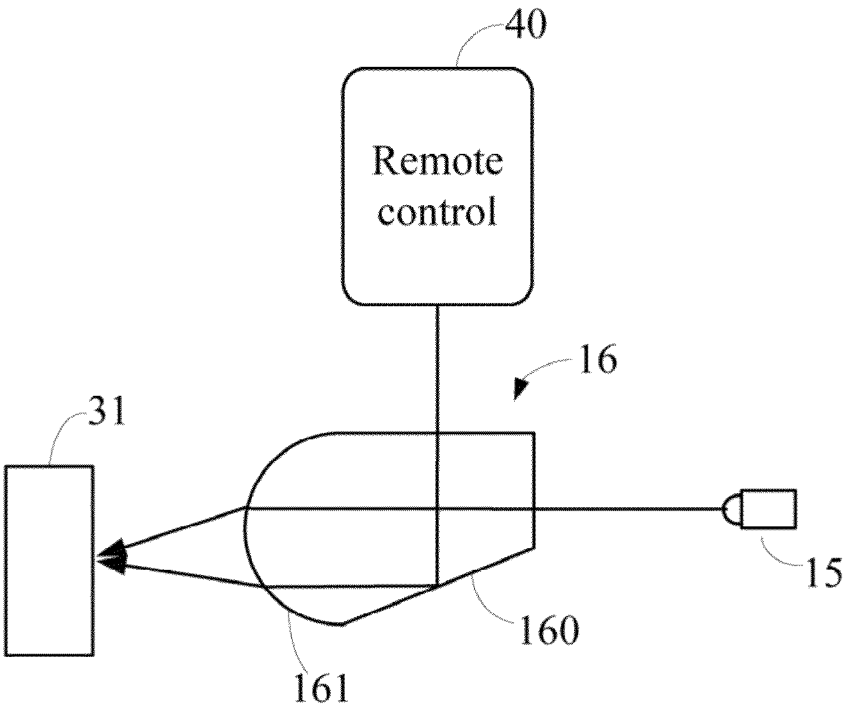
FIG. 6 is a schematic diagram of a light directing element of the remote control apparatus of FIG. 1 in accordance with an exemplary embodiment.

Referring to FIG. 6, in the embodiment, the light directing element 16 is a prism obliquely oriented relative to the first window 18. The light directing element 16 includes a reflection part 160 and an emitting part 161. The reflection part 160 faces the infrared transmitting unit 15 to reflect and direct the infrared signal transmitted by the infrared transmitting unit 15. The reflected infrared signal passes through the second window 19 and the third window 31 orderly and finally is received by the appliance 30.

The emitting part 161 faces the first window 18 to pass the infrared remote control signal transmitted by a remote control 40 through the first window 18. Then the transmitted remote control signal passes through the third window 31 and is received by the appliance 30. The locations of the reflection part 160 and the transmission part 161 can be exchanged.

In the embodiment, the control unit 13 is further configured to analyze the infrared remote control signal transmitted by the remote control 40 to determine the infrared remote control code, and stores the determined infrared remote control code in the storage unit 12 to update the relationship list, thereby presetting the relationship list by the remote controller 40.

Figure 7:
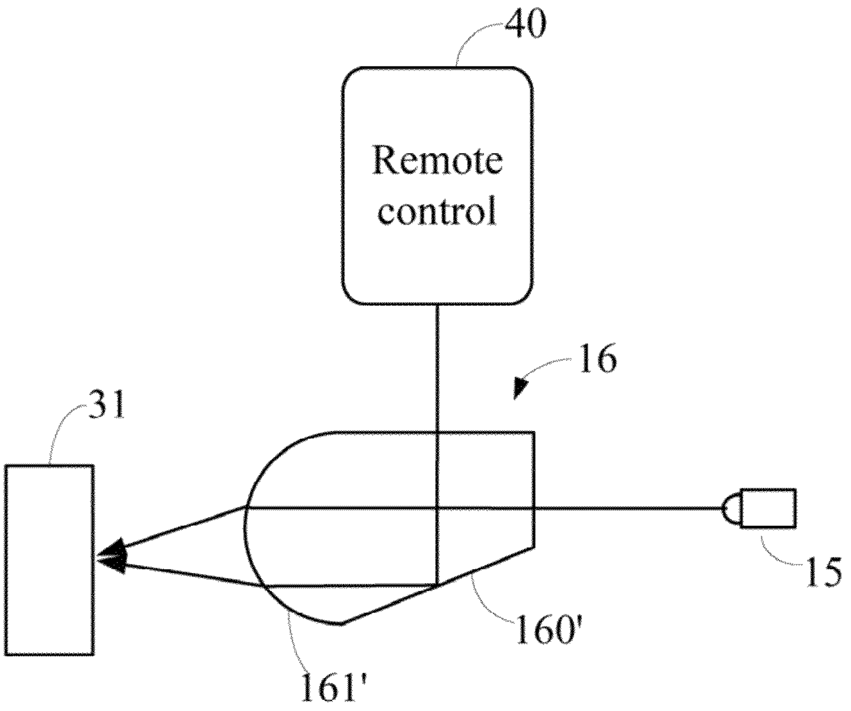
FIG. 7 is a schematic diagram of a light directing element of the remote control apparatus of FIG. 1 in accordance with another exemplary embodiment.

Referring to FIG. 7, in an alternative embodiment, the light directing element 16 is an optical lens having a reflection surface 160' and an emitting surface 161'. The emitting surface 161' faces the infrared transmitting unit 15 to allow the infrared signal transmitted by the infrared transmitting unit 15 to pass through the optical lens. The reflection surface 160' faces the first window 18 to reflect and direct the infrared signal from the first window 18 to the third window 31. In an alternative embodiment, the locations of the reflection surface 160' and the emitting surface 161' can be exchanged.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A remote control apparatus for controlling a plurality of remote controllable appliances, the remote control apparatus comprising:

a housing;

a signal receiving unit received in the housing and configured to receive a wireless signal transmitted from a mobile terminal, wherein the wireless signal carries an identification which comprises information of a selected appliance and a selected function to be performed on the selected appliance;

an infrared signal receiving window defined in the housing and configured for allowing an infrared remote control signal from an attached remote control for a selected appliance to pass therethrough;

an infrared signal transmitting window defined in the housing and configured to face toward the remote controllable appliances;

a storage unit configured to store a mapping relationship between identifications of the appliances and infrared remote control codes;

a control unit configured to determine the selected appliance and the selected function based upon the identification carried by the wireless signal, and further determine the infrared remote control code according to the mapping relationship;

a signal generating unit configured to generate an infrared signal carrying the determined infrared remote control code;

an infrared transmitting unit configured to emit the infrared signal; and a light directing element received in the housing, and configured to direct the infrared signal emitted by the infrared transmitting unit and the infrared remote control signal from the attached remote control to exit the housing through the infrared signal transmitting window and to be transmitted to the selected appliance, thereby controlling the selected appliance to execute the selected function.

2. The remote control apparatus as recited in claim 1, wherein the light directing element is an optical lens having an emitting surface and a reflection surface, the reflection surface configured to reflect and direct the infrared signal from the infrared transmitting unit to the infrared signal transmitting window, the emitting surface facing the infrared signal transmitting window.

3. The remote control apparatus as recited in claim 2, wherein the signal generating unit is further configured to analyze an infrared remote control signal from the attached remote control to determine the corresponding infrared remote control code, and the control unit is configured to store the infrared remote control code determined by the signal generating unit in the storage unit.

4. The remote control apparatus as recited in claim 1, wherein the light directing element is a prism obliquely oriented relative to the infrared receiving window, the prism configured to reflect and direct the infrared signal transmitted by the infrared transmitting unit to the infrared signal transmitting window, and allow the infrared remote control signal from the attached remote control to pass therethrough toward the infrared signal transmitting window.

* * * * *

UNITED STATES PATENT AND TRADEMARK OFFICE

CERTIFICATE OF CORRECTION

PATENT NO. : 8,929,739 B2
APPLICATION NO. : 13/551626
DATED : January 6, 2015
INVENTOR(S) : Kuan-Hong Hsieh et al.

It is certified that error appears in the above-identified patent and that said Letters Patent is hereby corrected as shown below:

Title page

Item (73) Assignees should read as follows: ScienBiziP Consulting (Shenzhen) Co., Ltd. Guang dong (CN)

Signed and Sealed this
Fourteenth Day of April, 2015

Michelle K. Lee
*Director of the United States Patent and Trademark Office*